Jan. 25, 1949.    T. H. SEELY ET AL    2,459,845
SOLE-PRESSING MECHANISM

Filed Aug. 7, 1946    11 Sheets-Sheet 1

Inventors
Thomas H. Seely
Lambert S. Linderoth Jr.
By their Attorney

Inventors
Thomas H. Seely
Lambert S. Linderoth Jr
By their Attorney

Jan. 25, 1949.　　　T. H. SEELY ET AL　　　2,459,845
SOLE-PRESSING MECHANISM
Filed Aug. 7, 1946　　　　　　　　　　　　　　11 Sheets-Sheet 6
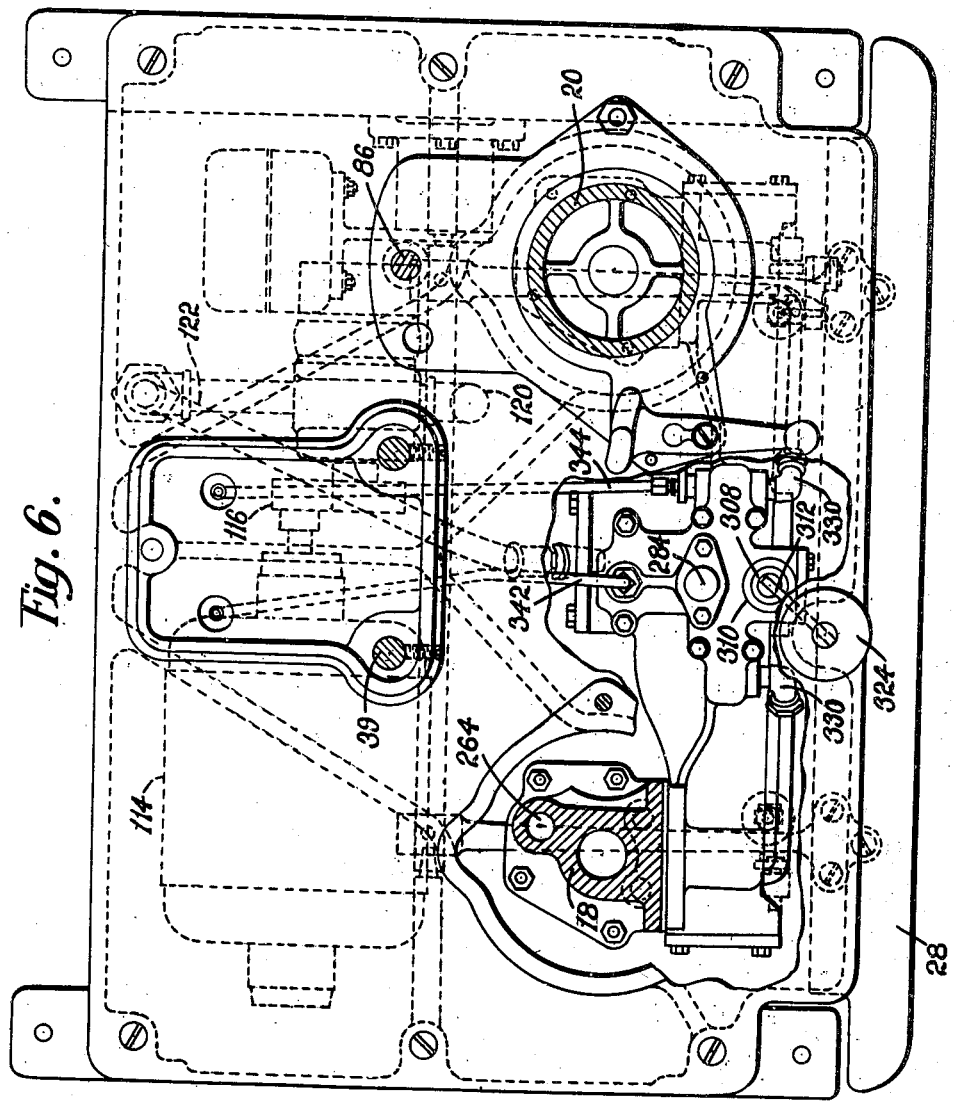
Fig. 6.
Inventors
Thomas H. Seely
Lambert S. Linderoth Jr.
By their Attorney

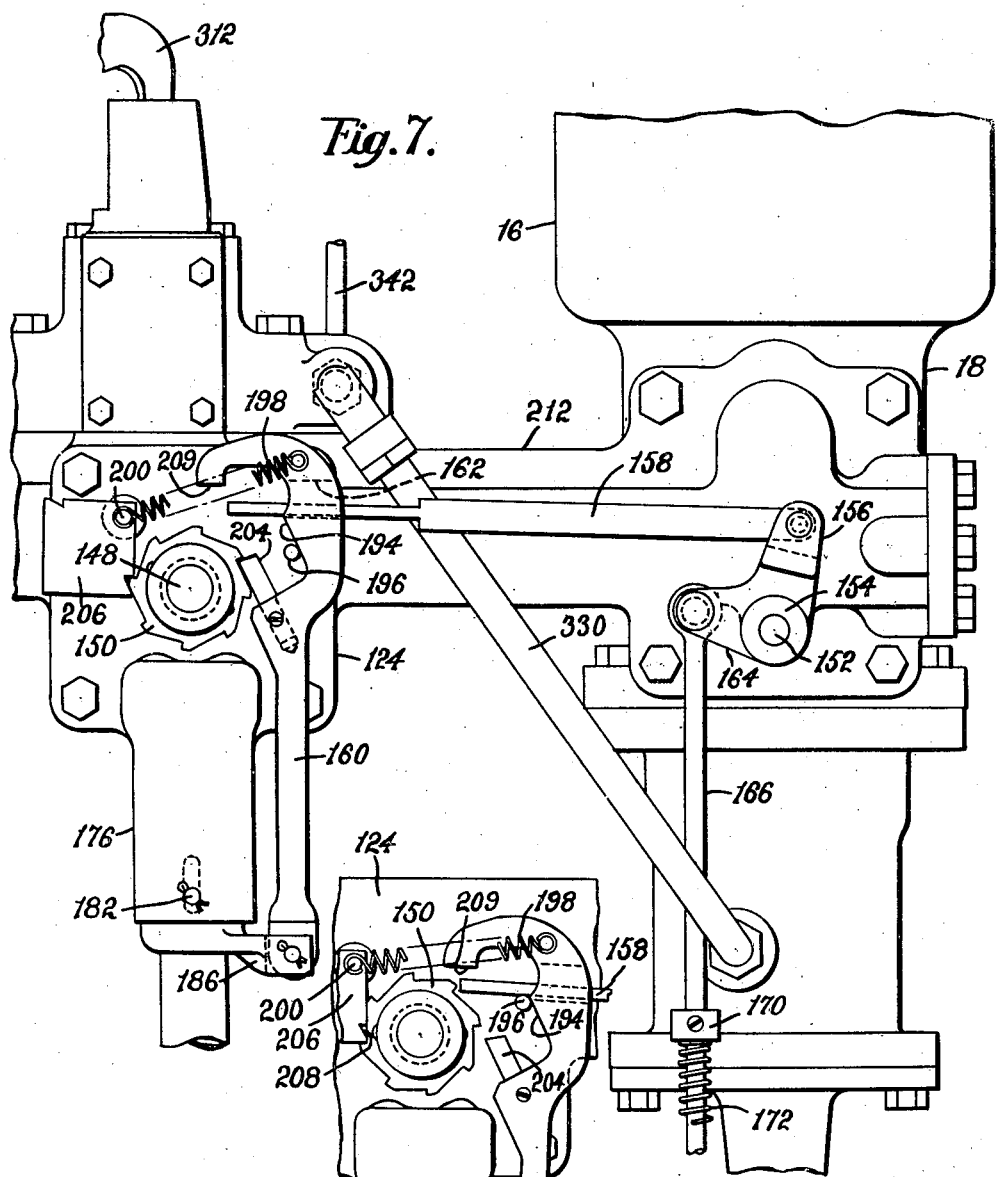
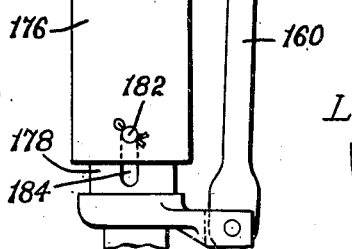

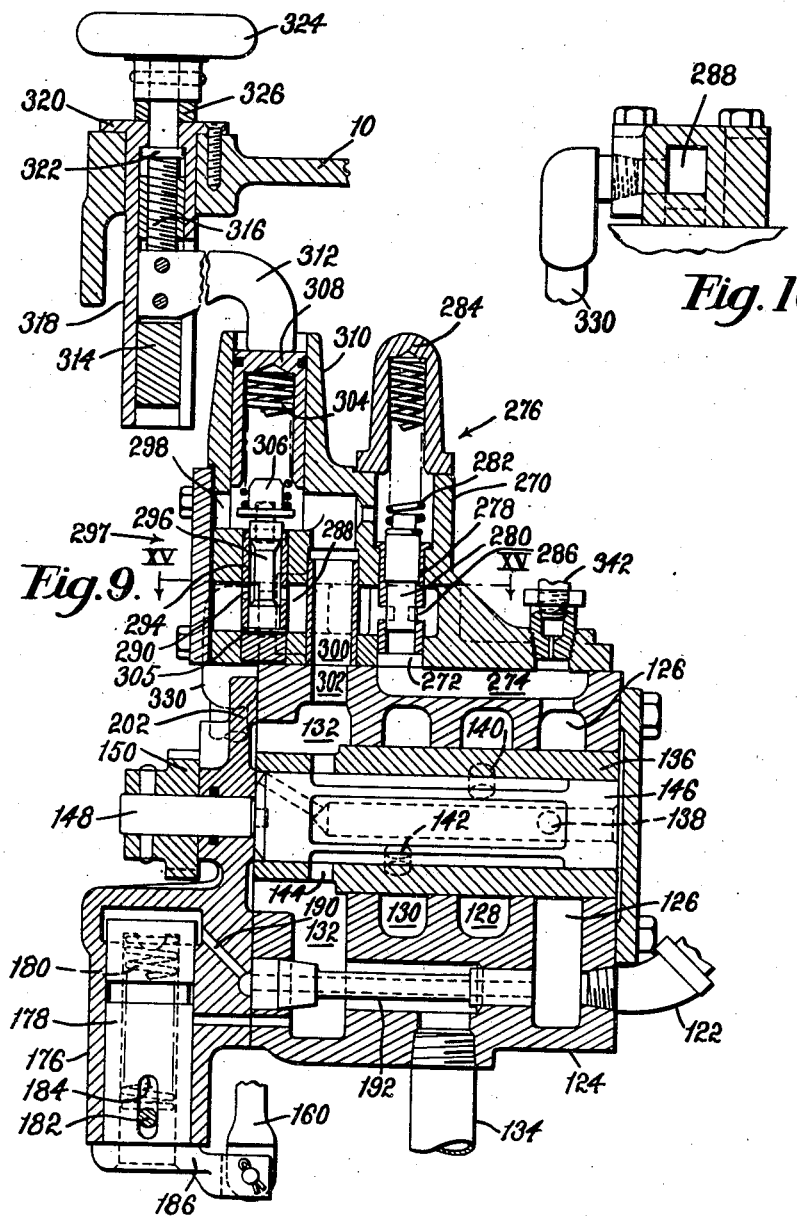

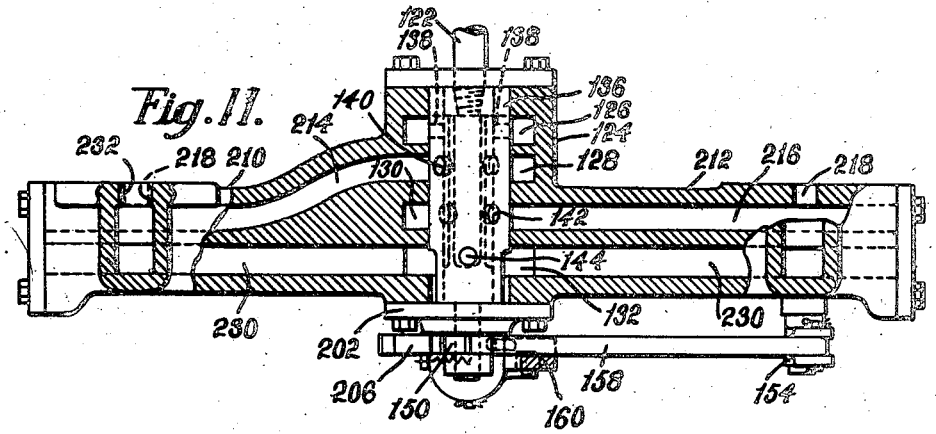
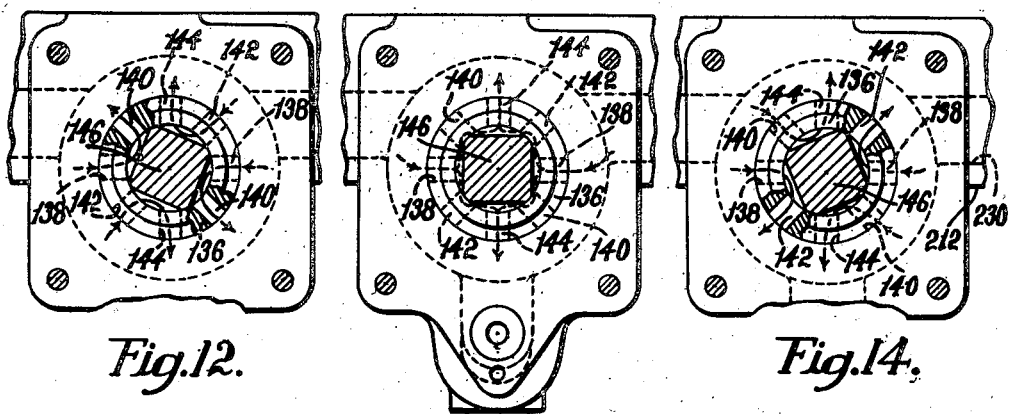
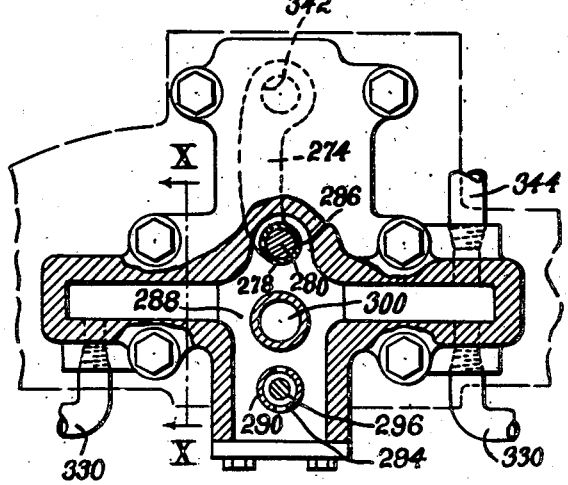

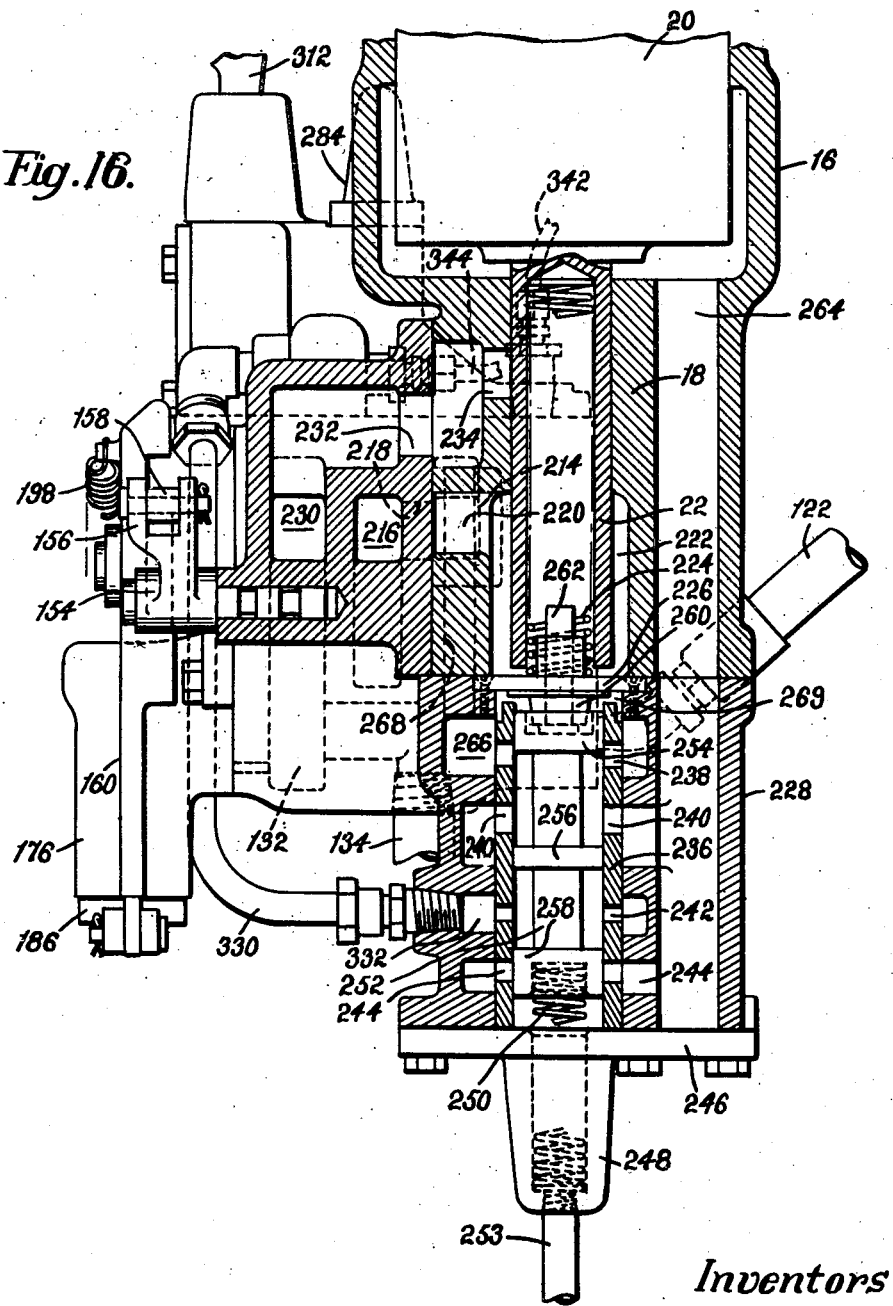

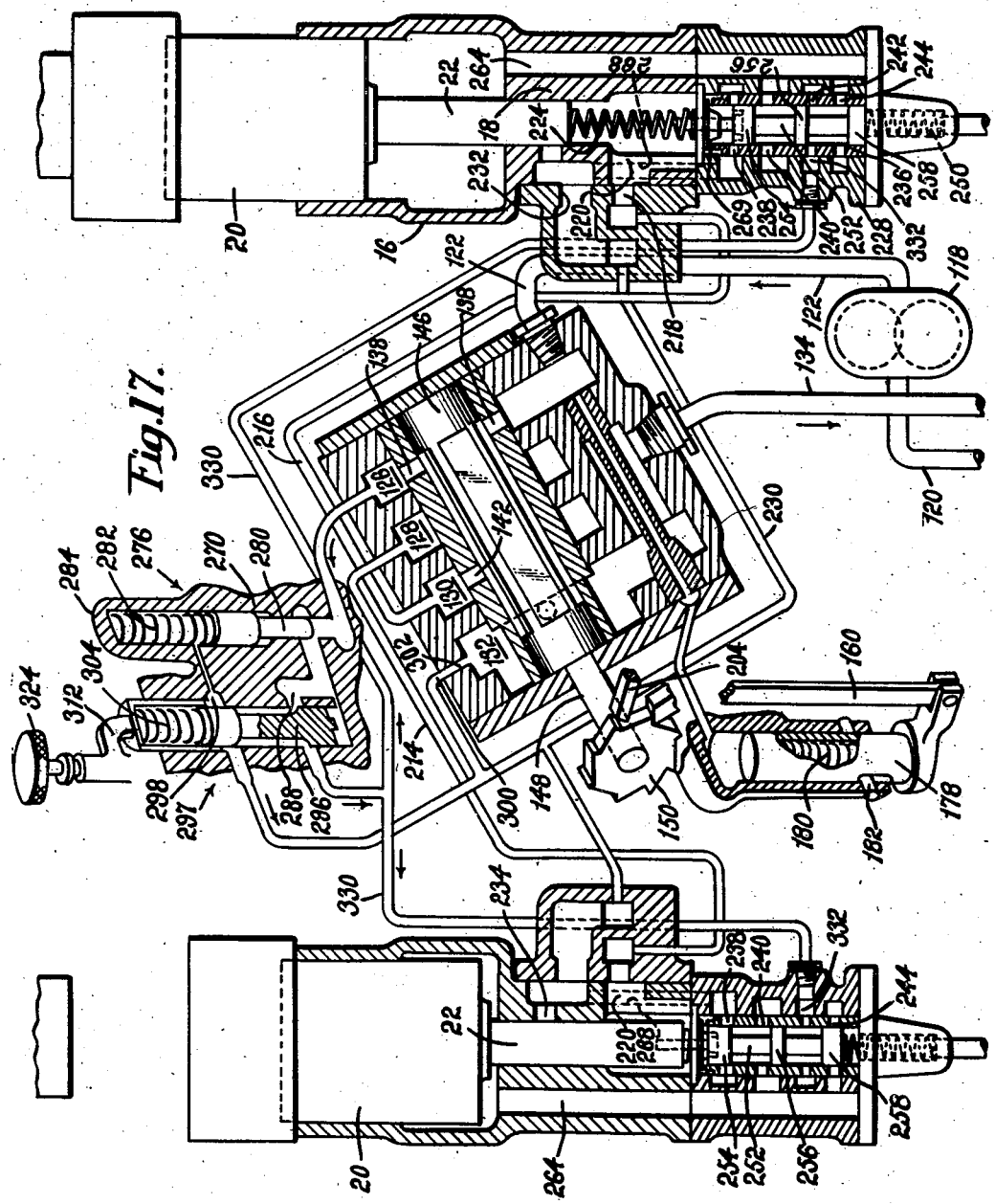

Patented Jan. 25, 1949

2,459,845

UNITED STATES PATENT OFFICE 2,459,845

SOLE-PRESSING MECHANISM

Thomas H. Seely, Melrose, and Lambert S. Linderoth, Jr., Marblehead, Mass., assignors to United Shoe Machinery Corporation, Flemington, N. J., a corporation of New Jersey Application August 7, 1946, Serial No. 689,068

23 Claims. (Cl. 12—36)

This invention relates to pressure-applying mechanisms, and more particularly to machines in which a member is movable by fluid under pressure to apply pressure to a work piece. The invention is illustrated herein, by way of example, as embodied in a machine for applying pressure to shoe bottoms, but it will be understood that the invention is not thus limited in its application.

For moving the pressure-applying member to apply pressure to a work piece a two-stage fluid pressure mechanism is employed. This mechanism includes a small piston for moving the member rapidly in pressure-applying direction and a large piston for exerting final pressure on the work, there being a small cylinder and a large cylinder housing the small and large pistons respectively.

It is an object of the present invention to provide in such a two-stage pressure-applying mechanism, improved means for controlling the pressure of fluid in the two cylinders in a manner to permit high operating efficiency at all times with a small pump while permitting variations in the fluid pressure applied to the work without affecting the speed of operation of the pressure-applying member. To this end and in accordance with a feature of the invention, the flow of fluid from the pump to the small cylinder is under the control of a pressure-regulating valve which is designed to permit a relatively high pressure in the small cylinder whereas the flow of fluid to the large cylinder in the final pressure-applying operation is controlled by a pressure-reducing valve which is readily adjustable and controls the pressure of fluid in the large cylinder at any predetermined value up to the pressure attained in the small cylinder. It is desirable to provide for a high pressure in the small cylinder in order that the inertia of the parts to be moved may be rapidly overcome while permitting the use of a small piston for this purpose which make possible the use of a small capacity pump. However, this pressure might be more than desired if it were attained in the large cylinder during the final pressure-applying operation and consequently it is advantageous to employ separate valves for controlling the pressures of the two cylinders. If the pressure in the small cylinder were limited to that of the large cylinder it would be necessary to employ a larger piston to obtain the same rapid rate of movement which would in turn necessitate the use of a larger capacity pump. Moreover, the rate of acceleration of the parts at the beginning would depend upon the final pressure to be applied and would not be uniform as in the present arrangement. In addition to the valves already mentioned, a third valve is employed which responds to the pressure in the small cylinder, this valve connecting the large cylinder to the source of fluid pressure through the pressure-regulating valve and the pressure-reducing valve after initial pressure has been applied to the work. This valve also permits communication between a fluid reservoir and the large cylinder until the latter is connected to the pump whereupon communication with the reservoir is cut off.

In order further to increase the productive capacity of the machine it is provided with a plurality of stations, there being two shown in the illustrated embodiment. In accordance with a further feature of the invention, a rotary distributor valve is provided which is arranged for turning movements each of a predetermined extent in one direction for alternately connecting the stations to the pump and permitting exhaust of pressure fluid from that station which is not connected thereto. This valve is arranged to be operated a predetermined extent upon each depression of a treadle, there being means for limiting the extent of such movement upon depression of the treadle and for preventing retrograde movement of the valve.

Another object of the invention is to provide improved safety mechanism for preventing premature movement of one of the pressure-applying members when the pump is started following a period of idleness of the machine. This is accomplished in accordance with a still further feature of the invention by providing means for automatically moving the distributor valve into a position intermediate those above mentioned in which intermediate position both stations of the machine and the high pressure side of the pump are connected to the fluid reservoir. The valve carries a ratchet arranged to be operated by a pawl which, when the pump is at rest, moves the valve into one of these intermediate positions, the pawl being carried by a member which renders the treadle ineffective to turn the valve so that even if the operator or any one should step on the treadle the valve would remain in this intermediate position and starting of the pump would have no effect on either station of the machine. A member responsive to the pressure at the outlet side of the pump moves the pawl into an inoperative position when the pump is started and renders the treadle operative so that upon starting of the pump the valve may be moved by depression of the treadle into position to apply pressure to one side of the machine.

In order to minimize the load on the pump and in acccordance with a still further feature of the invention the large cylinder at the side of the machine which is exhausting is connected to the large cylinder at the side of the machine which is being operated so that upon initial movement of the member into pressure-applying position in which fluid is being supplied by the pump only into the small cylinder the large cylinder is supplied from the other large cylinder of the machine and need not depend upon suction from the reservoir for its entire supply. Consequently the inertia of the parts is more readily overcome and less force is required to move the member into pressure-applying position during this stage.

The above and other features of the invention, including various details of construction and novel combinations of parts, will now be more particularly described by reference to the drawings and pointed out in the claims.

In the drawings,

Fig. 6 is a plan view partly in section of the lower part of the machine;

Fig. 7 is a front elevation on a still larger scale illustrating the distributor valve by which the flow of pressure fluid to the two sides of the machine is controlled and the fluid pressure motor at the right side of the machine, and showing the position of the parts when the pump which supplies the pressure fluid is at rest;

Fig. 8 is a front elevation of a portion of the mechanism of Fig. 7 showing the positions of the parts when the pump is in operation;

Fig. 9 is a vertical section through the distributor valve and associated pressure control valves;

Fig. 10 is a section on the line X—X of Fig. 15;

Fig. 11 is a horizontal section through the distributor valve;

Fig. 12 is a front elevation partly in section of the distributor valve positioned to supply operating fluid to the left side of the machine;

Fig. 13 is a view similar to Fig. 12 but with the valve in the position it assumes when the pump is at rest;

Fig. 14 is a view similar to Fig. 12 but with the distributor valve in position to supply operating fluid to the right side of the machine;

Fig. 15 is a plan view partly in section on the line XV—XV of Fig. 9;

Fig. 16 is a vertical section through the motor and associated valve at the right side of the machine, and Fig. 17 is a schematic view of the hydraulic system of the machine, some of the fluid passageways to be described being illustrated herein for clarity as pipes.

Figure 1:
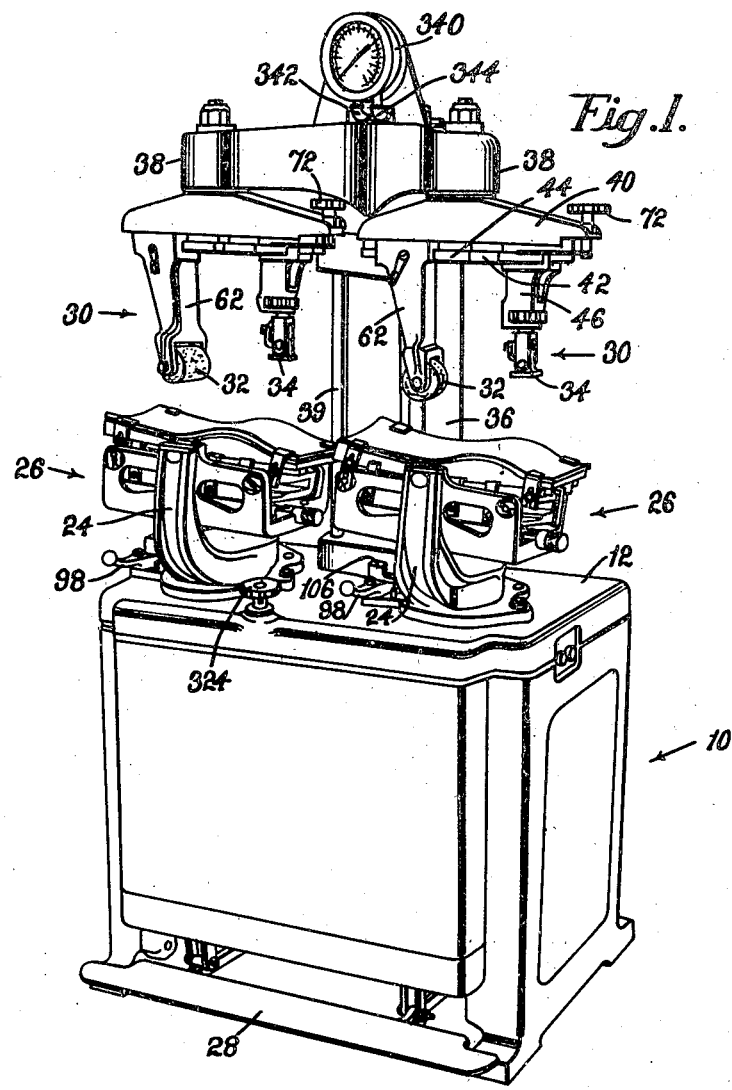
Fig. 1 is a view in perspective of one form of machine in which the invention is embodied.

The invention is illustrated herein as embodied in a two-station machine having a base in the form of a housing 10 (Fig. 1) carried by and depending from the top wall 12 of which is a pair of fluid-pressure motors 14 (Fig. 4) one at each side of the machine and located within the housing 10. Each of these motors comprises a large cylinder 16 and a small cylinder 18 in which are vertically movable large and small pistons 20 and 22 which are connected for conjoint movement. Each of the large pistons 20 projects upwardly through the top of the housing 10 and carries a yoke 24 in which is pivoted for rocking movement a work-supporting member in the form of a pad box 26 (Fig. 1) for supporting a sole and lasted shoe to which pressure is to be applied. The pad boxes 26 are of any suitable construction, and by way of example, are shown as being of the type illustrated and described in Letters Patent No. 2,289,360 granted July 14, 1942 on an application filed in the name of Fred V. Hart.

Figure 2:
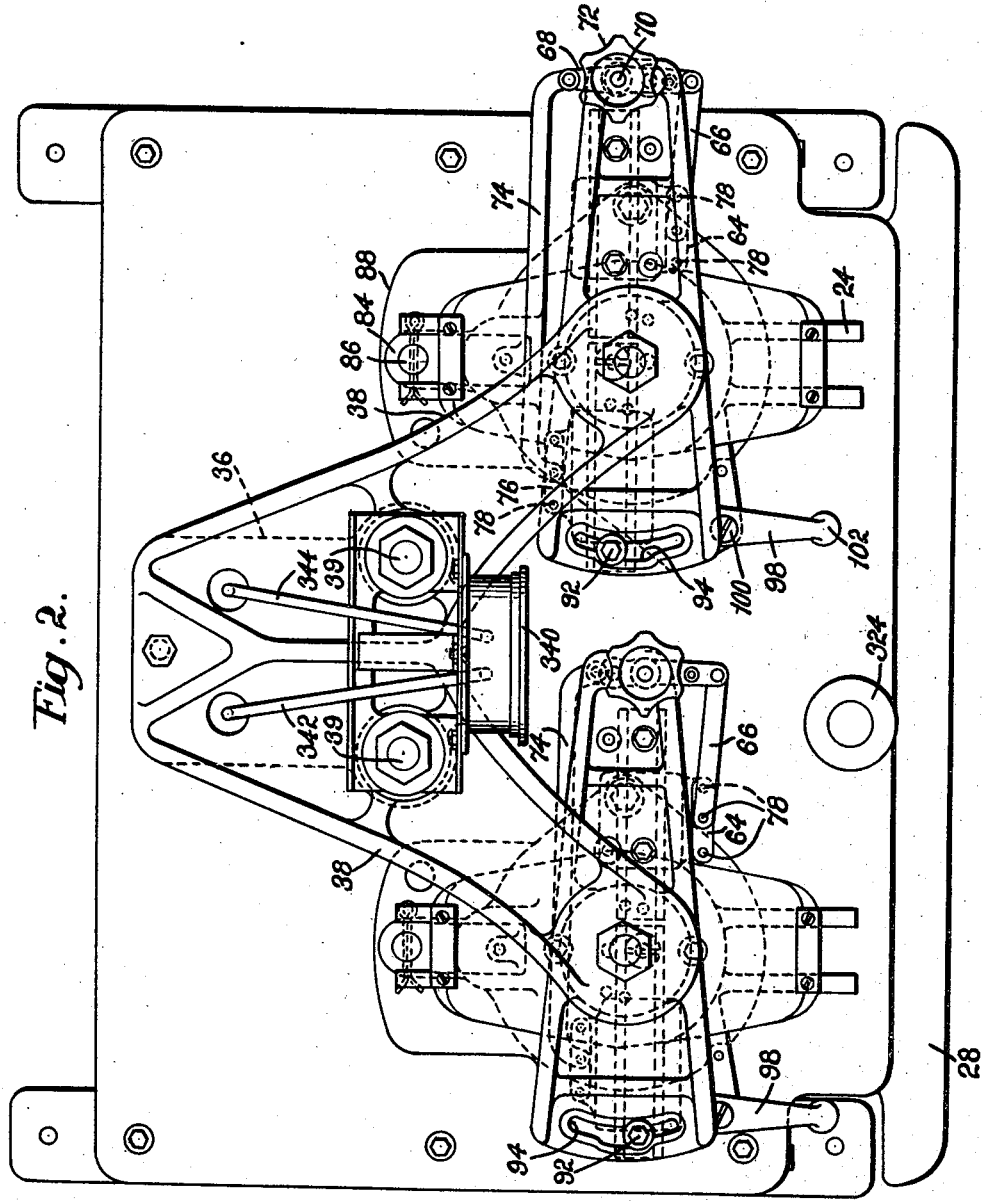
Fig. 2 is a plan view of the machine of Fig. 1 on a larger scale than Fig. 1.
Figure 3:
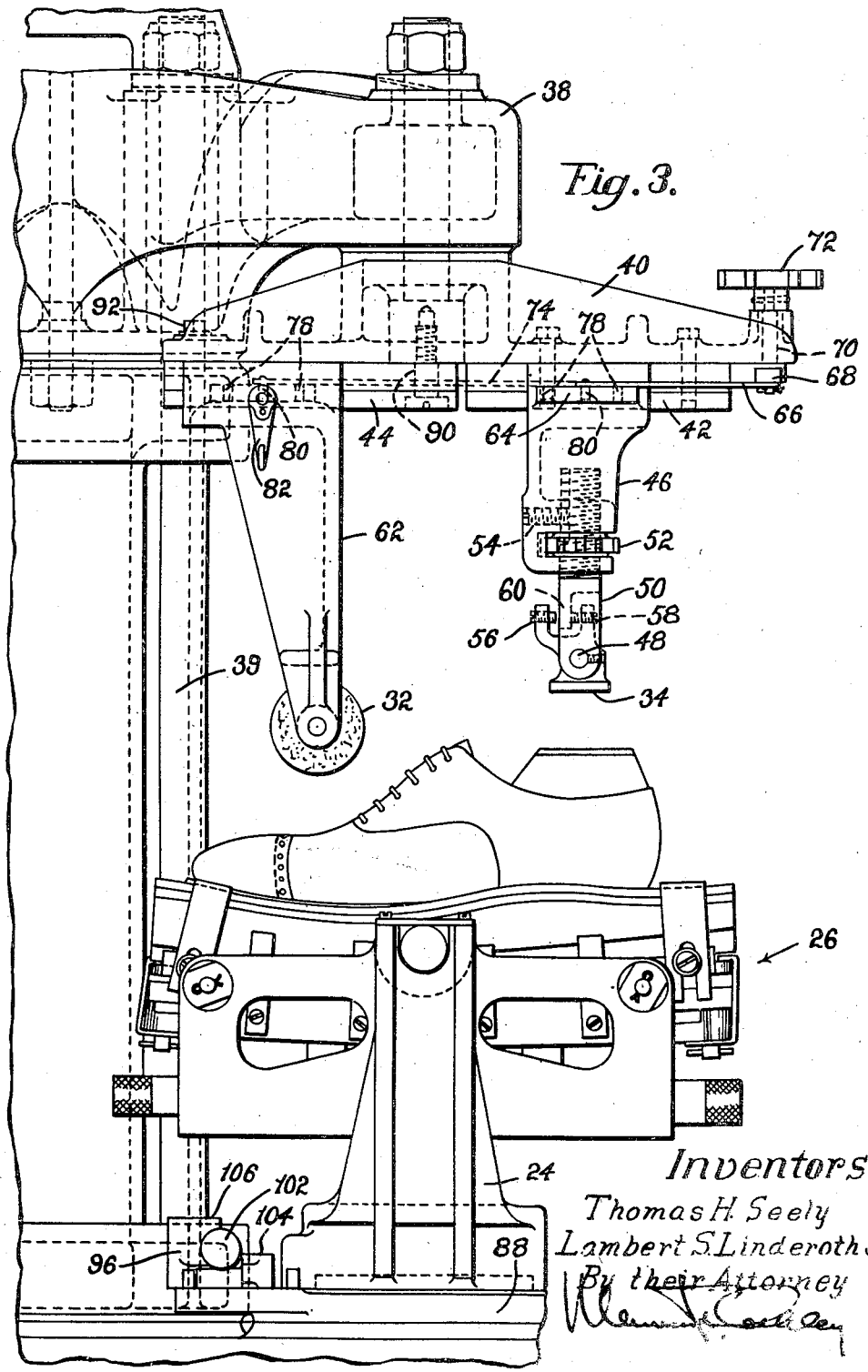
Fig. 3 is a front elevation of the upper portion of one side of the machine, illustrating the work-engaging members.

The machine is provided with a treadle 28 which, upon depression by the operator, operates a valve to supply pressure fluid to one of the motors 14 and permits exhaust of the fluid from the other so that one of the pad boxes is elevated and the other descends under the influence of gravity. For pressing the shoe against the sole on the pad box in response to upward movement of the pad box, the machine is provided with a pair of jacks 30, each of which comprises a toe support in the form of a roll 32 and a heel support in the form of a last-engaging plate 34. For supporting the jacks in operative positions relative to the pad boxes, a supporting post 36 is secured to the rearward portion of the housing 10 and is provided at its upper end with forwardly and outwardly extending arms 38 (Fig. 1, 2 and 3). Reinforcing rods 39 extending between arms 38 and the base of the machine assist in supporting the arms 38 against the upward thrust exerted thereon during the pressing operation. Each arm carries at its forward end a crosshead 40 to the under side of which is secured a slideway 42 for the heel support and a slideway 44 for the toe support. Each of these slideways is in the form of an inverted T in cross section, the slideway 42 carrying a supporting post 46 for the last-engaging plate 34. As shown in Fig. 3, the plate 34 is supported for limited rocking movement about a horizontal axis by a pin 48 in the lower end of a support 50 which has a threaded upper portion extending into the post 46. A nut 52 supported within a recess in the lower end of the post 46, holds the support 50 in the proper position of vertical adjustment. Turning of the support 50 upon rotation of the nut 52 to adjust the support vertically is prevented by a screw 54 threaded into the post and having a reduced inner end engageable with a spline formed in the threaded portion of the support 50. The extent of rocking movement of the last-engaging plate 34 relatively to the support 50 is controlled by screws 56, 58 threaded through upwardly extending arms carried by the plate 34 and engageable with opposite sides of a wall 60 of the support 50.

The roll 32 engageable with the toe end of the shoe is carried between spaced arms provided at the lower end of a depending post 62 carried for sliding movement lengthwise of the crosshead 40 by the slideway 44. Provision is made for adjusting the posts 46 and 62 simultaneously toward or from each other along the slideways 42 and 44 to accommodate shoes of different sizes. For this purpose the post 46 is provided with a forwardly projecting flange 64 which is connected by a link 66 to the forwardly projecting end of an arm 68 secured to the lower end of a vertical shaft 70 journaled in the outer end of the crosshead. Secured to the upper end of the shaft is a handle 72 by which the shaft may be turned thereby to move the post 46 along the slideway 42. As shown in Fig. 2 the rearward end of the arm 68 is connected by a link 74 to a rearwardly projecting flange 76 carried by the post 62. Thus it will be seen that upon turning the shaft 70 by the handle 72 the posts 46 and 62 will be moved along their respective slideways in opposite directions. To provide for individual adjustments of the heel and toe posts, each of the flanges 64 and 76 is provided with a plurality of apertures 78 (Fig. 3) to receive pins 80 carried by the adjacent ends of the links 66 and 74 whereby upon removal of the pin 80 carried by either of the links the associated post may be moved manually along its slideway and the pin inserted in another one of the holes. For locking the heel and toe supports in the desired positions along the slideways each of the posts 62 is provided with a locking screw extending through the post and engageable with the slideway, levers 82 being provided to facilitate turning of the screws, the arrangement being such that when the lever 82 is moved into the vertical position shown in Fig. 3 the post 62 is locked against movement along the slideway and by reason of its connection through the link 74, arm 68 and link 66 with the post 46, that post is also locked in the desired position of adjustment.

The machine may be operated with the pad boxes substantially in alinement with each other or if desired the pad boxes may be inclined relatively to each other with the adjacent ends located forwardly of the outer ends. For holding the pad boxes in the desired positions each of the yokes 24 is provided with a rearwardly extending boss 84 (Fig. 2) having a vertical aperture in which is secured a depending rod 86 designed to extend downwardly through either of a pair of holes in a plate 88 secured to the top of the housing 10, and through an alined aperture in the top of the housing. By removing the rods 86 the yokes, with the pistons by which they are supported, may be turned until the apertures in the bosses 84 are in alinement with the other holes in the plates 88 and the top of the housing 10 after which the rods are again replaced. These rods extend downwardly through the top of the housing a sufficient distance thereby to prevent turning of the yokes in any vertical position of the pad boxes during normal operation of the machine.

When the pad boxes are thus shifted the toe posts 62 must be correspondingly adjusted transversely of the crossheads 40 so that the rolls 32 will be in the proper positions to engage the toes of the shoes. For this purpose the slideways 44 are connected to their respective crossheads for pivotal movements about screws 90 (Fig. 3). The outer ends of the slideways are held in adjusted positions relatively to the crossheads by screws 92 (Fig. 2) which pass through arcuate slots 94 which are concentric with the screws 90 so that when the screws 92 are loosened the slideways may be pivoted about the screws 90 and clamped in the proper positions of adjustment by the screws 92.

When operating on small shoes less clearance is needed between the tops of the pad boxes and the toe and heel supports than is required when operating upon large shoes. In order to conserve time in the operation of the machine, provision is made for stopping the downward movements of the pad boxes in one of a plurality of positions depending on the clearance required. This is effected by providing adjustable stops 96 which may be moved into position below the bottoms of the yokes thereby to arrest their downward movements if desired in positions above that shown in Fig. 3. Each of these stops is carried by the inner end of an arm 98 (Figs. 1 and 2) pivoted at 100 to the associated plate 88, the forward end of the arm having a portion 102 arranged to be grasped by the operator to facilitate swinging the arms and varying the positions of the stops. Each of the stops has a pair of steps 104, 106 (Fig. 3). It will be understood that with the pad box in an elevated position the associated stop 96 may be swung to carry either step 104 or step 106 below the base of the yoke 24 so that at the conclusion of the pressure-applying operation the descent of the yoke 24 is limited in accordance with the position of the stop 96.

Pressure fluid for operating the machine is contained in a reservoir 110 (Figs. 4 and 5) formed in the bottom of the housing 10. This reservoir is provided with a cover plate 112 on which is supported an electric motor 114 connected by gearing 116 to a pump 118 also supported on the cover plate of the reservoir. The pump draws fluid from the reservoir through a pipe 120 and discharges it through a pipe 122 which is connected to a manifold 124 (Fig. 9). This manifold is provided with a plurality of chambers 126, 128, 130 and 132. The chamber 126 is connected directly to the outlet pipe 122 of the pump and the chambers 128, 130 are connected, as will be described, to the small cylinders 18 at the left and right hand sides of the machine, respectively. The chamber 132 is connected by a pipe 134 to the fluid reservoir 110. The manifold 124 has a central opening therethrough into which is fitted a ported sleeve 136 which, as shown in Figs. 9 and 12 is provided with four pairs of ports 138, 140, 142 and 144, the ports of each pair being spaced 180° apart. The ports 138 communicate with the pressure chamber 126, the ports 140 with the chamber 128 leading to the cylinder 18 at the left side of the machine, the ports 142 with the chamber 130 leading to the cylinder 18 at the right side of the machine and the ports 144 with the exhaust chamber 132.

For controlling the flow of fluid through the manifold a valve element 146 is journaled in the sleeve 136. As shown in Fig. 9 this valve element is provided with cylindrical end portions between which portions the valve element is generally square in cross section, as indicated in Figs. 12, 13 and 14. Thus passageways between the valve element and the sleeve are provided by which the flow of fluid between the various chambers of the manifold is controlled in accordance with the position of the valve element. With the valve element positioned as shown in Fig. 12 pressure fluid flows from the chamber 126 through ports 138 along the surface of the valve element and through ports 140 into the chamber 128 and the cylinder 18 at the left side of the machine. At the same time the pressure fluid from the small cylinder at the right side of the machine flows from the chamber 130 through ports 142 along the valve element through ports 144 into the exhaust chamber 132. With the valve element 146 rotated 45° from the position shown in Fig. 12 into the position shown in Fig. 14 it will be apparent that the pressure chamber 126 is connected through ports 142 to the chamber 130 whereas the chamber 128 is connected through ports 140 to the exhaust chamber 132.

For turning the valve element 146 in steps of 45° in order to operate the two stations of the machine alternately the valve element 146 has connected to it a forwardly extending shaft 148 to which is pinned a ratchet 150 (Fig. 7). Pivoted at 152 to an extension of the manifold 124 secured to the cylinder 18 at the right side of the machine is a bell-crank lever 154 having an upwardly extending arm 156 to which is pivoted a bar 158. This bar extends toward the center of the machine passing through a slot 162 in the upper end of a vertically movable member 160. During the normal operation of the machine the member 160 assumes the position shown in Fig. 8 as will be explained, in which the adjacent end of the bar 158 is in position to engage one of the teeth of the ratchet 150 upon movement of the bell-crank lever 154 in a counter-clockwise direction. When this lever is so moved the ratchet 150 is moved in a counterclockwise direction until downward movement of the treadle is stopped as will be explained, whereupon further movement of the bar is arrested. This occurs as soon as the ratchet 150 has been turned through 45°. The bell-crank lever 154 has an arm 164 which is connected by a link 166 with one of a pair of supporting arms 168 (Fig. 5) for the treadle 28. The link 166 carries a collar 170 (Fig. 7) engageable with the upper end of a spring 172 the lower end of which engages the cover of the reservoir 110, the spring thereby urging the link 166 upwardly and the bell-crank lever 154 into the position shown in Fig. 7. The arms 168 carrying the treadle 28 are pivoted at 174 (Fig. 5) to the frame of the machine and it will be noted in Figs. 1 and 4 that the treadle extends across the entire width of the machine so that the operator may stand at any position in front of the machine and by depressing the treadle actuate the valve element 146 to cause upward movement of one of the pad boxes and downward movement of the other pad box. Links 175 depend from the frame of the machine and have slotted portions at their lower ends receiving pins 177, carried by the arms 168, thereby to limit movements of the treadle and movements of the bar 158 thereby.

When the electric motor 114 driving the pump 118 is stopped for any reason, such as when the machine is shut down at the end of the day, that pad box which was in its up position when the machine was stopped will gradually descend, inasmuch as the weight of the pad box and its associated pistons will cause the oil to flow back through the pump into the reservoir. If the valve element 146 remained in the positions shown in either Fig. 12 or 14, one of the pad boxes would immediately ascend upon starting the pump without the necessity of treadling the machine. In order to eliminate this element of danger to the operator, provision is made for automatically turning the valve element into a neutral position intermediate its operative positions, as shown in Fig. 13, in which the pressure chamber 126 communicates directly with the exhaust chamber 132 so that insufficient pressure is available to operate either side of the machine. The valve will remain in this position until the pressure has increased to a predetermined value and the treadle 28 subsequently operated. For thus operating the valve a cylinder 176 (Figs. 7 to 9) is carried by the forward wall of the manifold 124 and houses a hollow piston 178 which is urged upwardly into the position shown in Fig. 9 by a spring 180 acting between the top wall of the piston and a pin 182 which extends through slots 184 in the piston and outwardly through the wall of the cylinder. Secured to the lower end of the piston is a rearwardly extending arm 186 to which is pivoted the lower end of the member 160.

The upper end of the cylinder 176 communicates by way of a passageway 190 and a tube 192 extending through the lower portion of the chamber 132, with the pressure chamber 126. With the pump in operation the pressure of the fluid in the upper end of the cylinder 176 holds the piston 178 in its down position as shown in Fig. 8, the extent of downward movement of the piston being limited by engagement of the piston at the upper end of the slot 184 with the pin 182. When the pump is idle, however, the pressure above the piston 178 drops whereupon the spring 180 forces the piston upwardly into the position shown in Figs. 7 and 9. As shown in Figs. 7 and 8, the member 160 has an inclined surface 194 which is maintained in engagement with a pin 196 by a spring 198 secured between the upper end of the member and a pin 200 carried by the forward wall of the manifold 124. With the pump running the member 160 assumes the position shown in Fig. 8 in which the bar 158 is positioned to actuate the ratchet 150 upon depression of the treadle. When the pump is stopped the member 160 is moved upwardly into the position shown in Fig. 7 lifting the adjacent end of the bar 158 out of operative position with respect to the ratchet 150 so that should the treadle be depressed at this time no motion will be imparted by the bar 158 to the ratchet 150.

The member 160 carries a pawl 204 which engages the ratchet 150 upon movement of the member 160 from the position in Fig. 8 into the position shown in Fig. 7, causing the ratchet 150 to be rotated through an angle of 22½°, thereby moving the valve element into an intermediate position as shown in Fig. 13. Consequently when the pump is again started the pressure chamber 126 is connected directly to the exhaust chamber 132 as heretofore explained and both pad boxes remain in their down positions. It will be apparent that the valve cannot be turned by the operator depressing the treadle until the member 160 has moved downwardly into the position shown in Fig. 8 by starting of the pump. When the member 160 is thus moved its upper end is cammed away from the ratchet by the engagement of the inclined surface 194 with the pin 196 so that the pawl 204 does not interfere with subsequent movement of the ratchet by the bar 158.

In order to prevent movement of the ratchet 150 in a clockwise direction upon withdrawal of the bar 158 at the end of a valve-indexing operation, or upon withdrawal of the pawl 204 when the pump is started, a locking pawl 206 is pivoted on the pin 200 and by its weight is held in engagement with the ratchet as shown in Figs. 7 and 8. During normal operation of the machine the teeth of the ratchet engage the under surface of the pawl 206 following each operation of the ratchet thereby preventing movement of the ratchet in a clockwise direction. The pawl 206 has a notch 208 to receive a tooth in the ratchet when it is moved into an intermediate position by the pawl 204 as shown in Fig. 7 so that the valve will be held against clockwise movement in the position to which it is moved at all times. To prevent movement of the valve beyond the desired position due to its momentum, when the treadle reaches the limit of its downward movement, the bar 158 rides upwardly into engagement with a surface 209 of the member 160, and the tooth of the ratchet behind the one engaged by the bar is wedged against the undersurface of the bar so that the ratchet can turn only through an angle of approximately 45° in response to each depression of the treadle.

The manifold 124 is provided with laterally extending portions 210, 212 (Fig. 11) having passageways 214, 216 the inner ends of which communicate with the chambers 128, 130 respectively.

The outer ends of the extensions 210, 212 are secured to the front walls of the cylinders 18 at the left and right sides of the machine respectively. Ports 218 provide communication between the passageways 214, 216 with ports 220 (Fig. 16) in the cylinder walls. The cylinders are enlarged at their lower portions to form chambers 222 surrounding the lower ends of the pistons 22. These pistons are hollowed out to receive compression springs 224 which are not strong enough to sustain the weight of the pistons 20, 22 and the pad boxes but assist in overcoming the inertia of these parts when pressure is first applied thereto. The lower end of each spring 224 rests on a plate 226 secured to the top of a valve housing 228 secured to the lower end of the cylinder 18.

With the valve element 146 in the position shown in Fig. 12 pressure fluid will flow from the chamber 126 through the ports 138, 140 into the chamber 128 and thence through passageway 214 to the cylinder 18 at the left side of the machine whereupon the piston 22 with the piston 20 is moved upwardly. This upward movement is effected rapidly due to the small size of the piston 22, requiring a small amount of fluid to obtain sufficient movement to carry a shoe on the pad box into engagement with the jack.

Each of the lateral extensions 210, 212 of the manifold 124 (Fig. 11) is provided with a passageway 230 communicating with the exhaust chamber 132 in the manifold, the outer ends of these passageways terminating in ports 232 (Fig. 16). The upper ends of the cylinders 18 have ports 234 providing communication between the upper ends of the cylinders and the ports 232, passageways 230 and the exhaust chamber 132. The ports 234 are normally covered by the pistons 22 but in the event that no work is placed on the pad box before pressure fluid is admitted into the cylinder 18, the port 234 will be uncovered before the pad box rises high enough to engage the jack, whereupon the fluid in the cylinder will exhaust through the port 234 and passageway 230 into the exhaust chamber 132 and back through pipe 134 into the fluid reservoir. Accordingly, the port 234 limits the extent of upward movement of the pad box and the arrangement just described eliminates the possibility of damaging the machine by failure to place a work piece on the pad box.

Within the valve housing 228 is arranged a ported valve sleeve 236 having four sets of ports 238, 240, 242, 244. The lower end of the valve housing is closed by a plate 246 which retains the sleeve 236 in position, the plate 246 having a depending cup-shaped portion 248 providing an abutment for one end of a compression spring 250, the other end of which acts against the lower end of a slide valve member 252 within the sleeve 236. A pipe 253 provides communication between the bottom of the valve member and the fluid reservoir so that the vertical movements of the valve member may take place with no variations in pressure resulting therefrom in the space below the valve member. This valve member includes valve elements 254, 256, and 258 by which the flow through the various ports of the sleeve 236 is controlled in accordance with the position of the valve member. The spring 250 normally holds the valve member in the position shown in Fig. 16 with the valve element 254 in engagement with a stop 260 carried by the plate 226. A valve stem 262 projects upwardly from the valve element 254 through the plate 226 into the lower end of the cylinder 18 where it is subject to the pressure of the fluid within the cylinder. When the pressure of the operating fluid in the bottom of the cylinder 18 increases to a predetermined value upon movement of the shoe into engagement with the jack, the valve member 252 is moved downwardly until the element 258 seats on the plate 246.

In order to maintain the large cylinder 16 filled with fluid during the upward movement of the pistons 20 and 22, before fluid under pressure is supplied by the pump to the cylinder 16, the large cylinders at each side of the machine are interconnected so that as one piston moves down the fluid forced from its cylinder will pass into the corresponding cylinder at the opposite side of the machine during upward movement of the piston therein.

For this purpose each of the large cylinders 16 communicates by way of a passageway 264 with the port 240 in the valve sleeve 236 as shown in Figs. 16 and 17. At the beginning of the upward movement of the pistons, the valve member 252 is in the position shown in Fig. 16 in which the ports 240 and 238 are uncovered and interconnected. The ports 238 at each side of the machine communicate with chambers 266 which in turn communicate by way of passageways 268 with the ports 232 formed in the lateral extensions of the manifold 124 (Fig. 11). Thus it will be seen that when the valve members 252 are in their up positions the large cylinders 16 are in communication with each other. This condition exists at the moment that pressure fluid is initially introduced into one of the cylinders 222 and the other side of the machine starts to exhaust. As heretofore explained, and as shown in Fig. 9, the exhaust chamber 132 communicates by way of the pipe 134 with the fluid reservoir so that any excess fluid from that side of the machine which is being exhausted may be returned to the reservoir or any deficiency in fluid required for maintaining the large cylinder 16 at the other side of the machine filled with fluid may be drawn through the pipe 134 into the exhaust chamber 132 and thence drawn by way of passageway 230, port 232, passageway 268, chamber 266, ports 238, 240 and passageway 264 into the cylinder 16. The suction created by upward movement of the large piston 20 acts through ports 240, 238 and a passageway 269 on the top of valve element 254. This suction assists the spring 250 in preventing premature downward movement of the valve 252.

Secured to the top of the manifold 124 is a valve housing 270 having a port 272 communicating with a chamber 274 which is in turn in direct communication with the pressure chamber 126. Flow of fluid from the chamber 274 through the port 272 is controlled by a pressure-regulating valve 276 which comprises a valve sleeve 278 in which is slidable a valve element 280. A spring 282 engaging the upper end of the valve element 280 and retained by a cap 284 normally holds the valve element 280 in the position shown in Fig. 9 in which it prevents flow of the pressure fluid outwardly through ports 286 formed in the valve sleeve 278. However, upon a rise in pressure in the chamber 274 to a predetermined value the valve element 280 is forced upwardly to permit the fluid to exhaust from the chamber outwardly through ports 286 into a passageway 288 extending forwardly in the valve housing 270.

The passageway 288 communicates through ports 290 with the interior of a valve sleeve 294 in which is slidable a valve element 296 of a pressure reducing valve 297. This valve element normally closes the upper end of the sleeve to a chamber 298 which communicates by way of a pipe 300 and a port 302 with the exhaust chamber 132. A spring 304 bears against a flanged spring retainer 306 carried by an extension of the valve element 296, the other end of the spring being retained by a cup-shaped member 308 slidable vertically in an extension 310 of the valve housing. The vertical position of the cup-shaped member 308 determines the force exerted by the spring 304 on the valve element 296 and consequently the pressure required to be exerted on the under surface of the valve through ports 305 to move the valve element upwardly permitting the fluid to flow through ports 290 upwardly into the chamber 298 and thence into the exhaust chamber 132.

For adjusting the force exerted by the spring 304 there is provided a vertically movable arm 312 forming an abutment for the upper end of the member 308. This arm 312 is pinned to a vertically movable support 314, the upper portion of which is threaded to receive an adjusting screw 316 which is rotatable to vary the vertical position of the support. The support is guided for vertical movement in a tube 318 having a flanged upper end 320 by which it is supported from the top of the housing 10. For preventing vertical movement of the screw 316 it is provided near its upper end with a collar 322 engageable with the under side of the flanged portion 320 of the tube 318, the screw being provided with a handle 324 pinned thereto and resting on a washer 326 which engages the top of the flanged portion 320. It will be obvious that by turning the handle 324 the screw 316 may be rotated to change the vertical position of the arm 312 and accordingly to vary the force exerted by the spring 304 and the force required to move the valve element 296 upwardly to permit exhaust of the pressure fluid.

It will be apparent that the pressure-regulating valve 276 and the pressure-reducing valve 297 are arranged in series, the valve 276 being designed to limit the pressure of the fluid exerted upon the small pistons, whereas the other valve is provided to limit the pressure of the fluid exerted on the large pistons. No adjustment is provided for the pressure-regulating valve 276 although it will be apparent that such adjustment might be provided if desired. However, this valve is intended to open only when the pressure thereon attains a relatively high value such as, for example, of the order of 200 lbs. per square inch, whereas the pressure-reducing valve will open to exhaust at a pressure determined by the setting of the spring 304 but the maximum pressure preferably would not exceed the pressure at which the first valve opens. In other words if the pressure-regulating valve 276 opens at a pressure of 200 lbs. per square inch the other valve would be designed to open at any predetermined pressure within a range of from 0 to 200 lbs. per square inch in accordance with the setting of the spring 304. The purpose of this arrangement of the pressure-regulating and pressure-reducing valves will be fully explained in the description of the operation of the apparatus.

The chamber 288 communicates by way of a pair of pipes 330 (Figs. 4, 9, 16 and 17) with chambers 332 in the valve housing 228 at each side of the machine, each of these chambers 332 communicating by way of the ports 242 with the interior of the sleeve 236 between the valve elements 256 and 258. With the valve member 252 in its up position in which it is initially held by the spring 250 the fluid in the chamber 332 is trapped between the valve elements 256 and 258. However, at the completion of the preliminary upward movement of the jack the pressure within the piston 22 increases sufficiently to force the valve member 252 downwardly into the position shown at the right in Fig. 17 whereupon the ports 242 and 244 are in communication and pressure fluid from the pipe 230 flows into the passageway 264 and the cylinder 16 thereby to exert the final pressure on the large piston 20 in the pressing operation.

For indicating the pressures exerted in the small and large cylinders a duplex pressure gage 340 (Fig. 1) is mounted on the upper end of the supporting post 36 of the machine. This gage preferably has two indicating needles controlled by separate pressure-responsive elements which are not shown but may be of conventional construction. One of these elements is connected by a pipe 342 (Figs. 1, 6 and 9) to the chamber 274 (Fig. 9) which is in communication with the pressure chamber 126 so that the needle controlled thereby indicates the pressure of the operating fluid in the small cylinder at either side of the machine. The other pressure element of the gage is connected by a pipe 344 (Figs. 1, 6 and 15) to the passageway 288 from which the pressure fluid flows to the large cylinders so that the needle connected to this other element of the gage indicates the pressure of the operating fluid in the large cylinder at either side of the machine.

Figure 4:
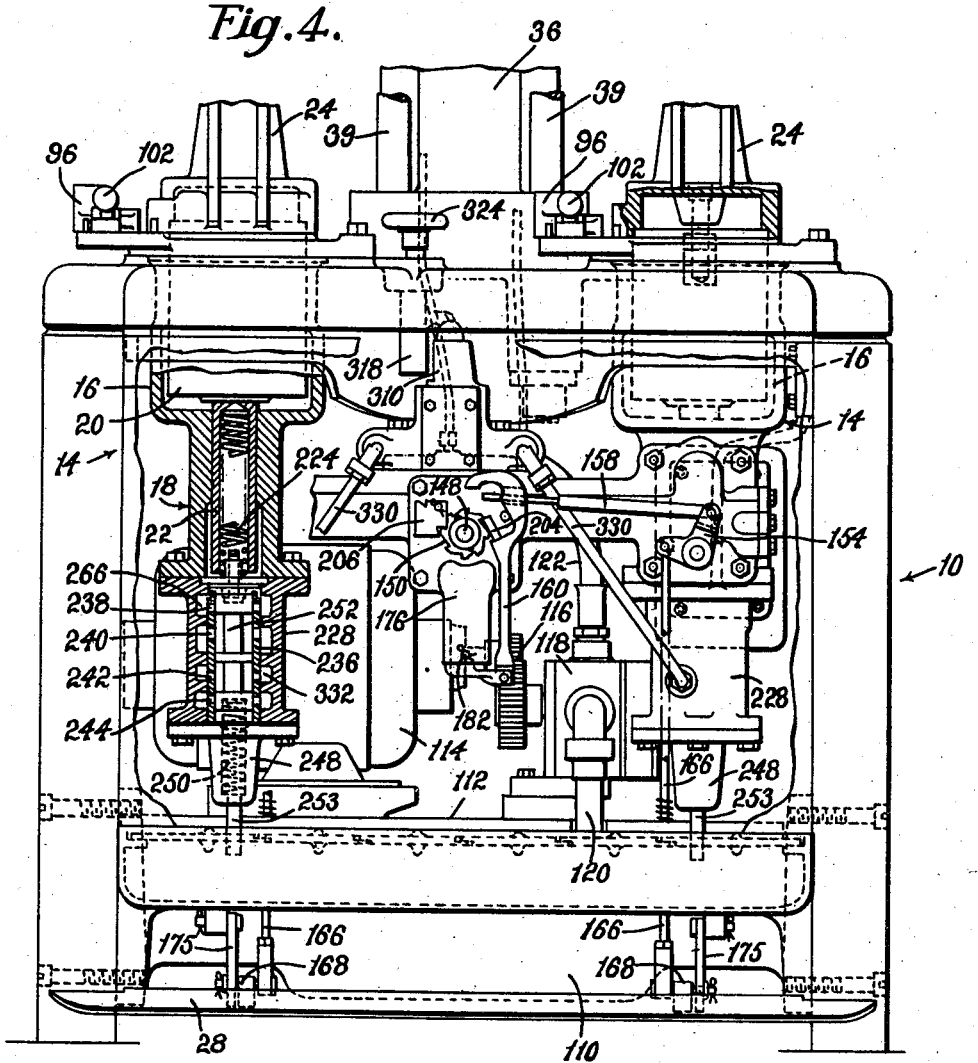
Fig. 4 is a front elevation partly in section of the lower part of the machine with the front wall broken away.
Figure 5:
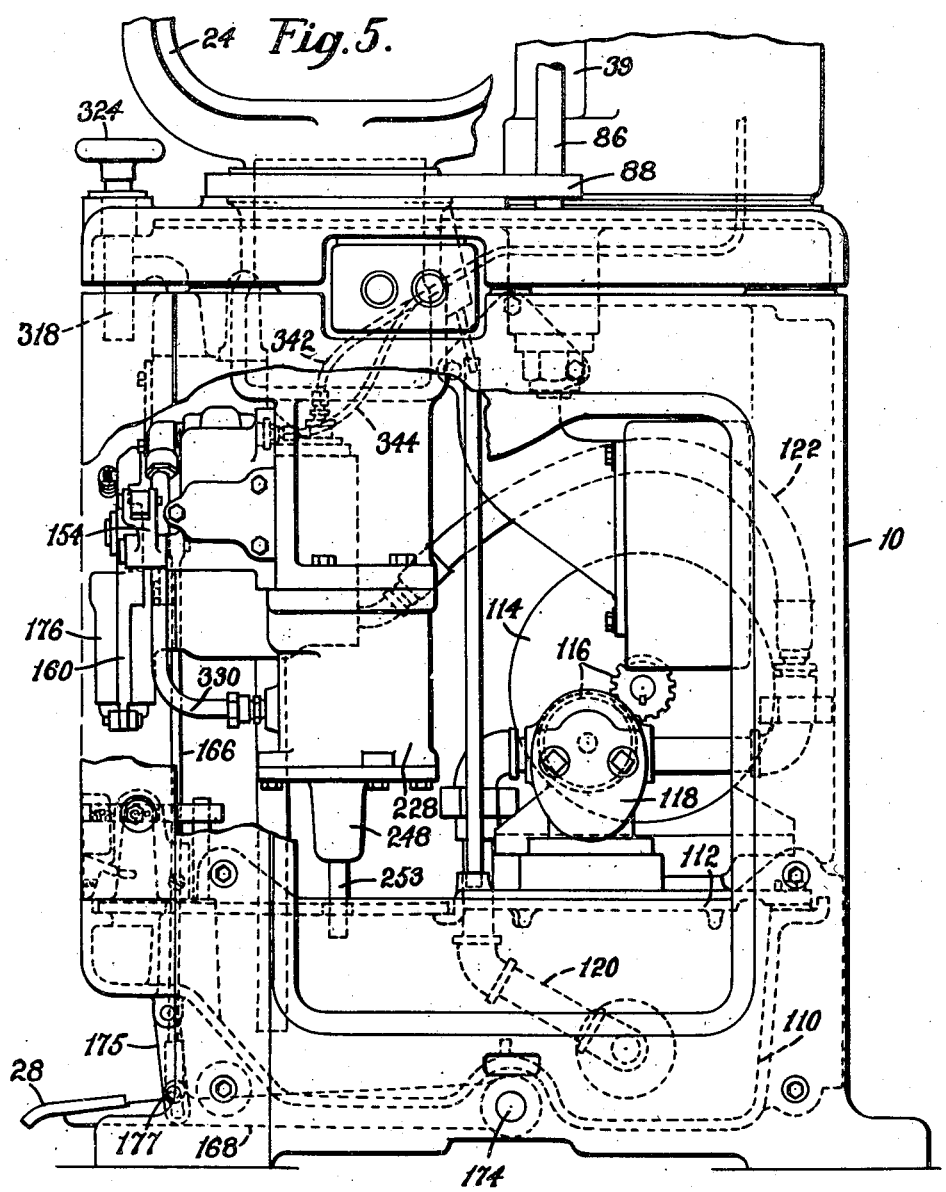
Fig. 5 is a side elevation of the lower part of the machine with the side wall broken away.

In describing the operation of the machine it will be assumed that the pump is idle and that the valve element 146 is in the position shown in Fig. 13. At this time the spring 180 (Fig. 9) in the cylinder 176 holds the piston 178 in its uppermost position as indicated in Figs. 4, 7 and 9 with the pawl 204 in engagement with the ratchet 150 and with the bar 158 elevated by the member 160 so that depression of the treadle 28 will not impart any movement to the ratchet 150 and the valve element. Upon starting the pump the pressure in the chamber 126 (Figs. 9 and 17) rises sufficiently to overcome the force of the spring 180 thereby moving the piston 178 downwardly into the position shown in Fig. 8 in which the pin 182 is engaged by the piston at the upper end of the slot 184. The member 160 now assumes the position shown in Fig. 8 and the bar 158 is in position to operate the ratchet 150 upon depression of the treadle. The pressure within the chamber 126 (Fig. 9) does not rise sufficiently, however, until the valve element 140 is moved out of the position shown in Fig. 13, to cause upward movement of the pad box at either side of the machine inasmuch as the pressure chamber 126 is connected by way of the ports 140 and 142 to the exhaust ports 144. Accordingly, starting the pump in operation by closing the circuit to the electric motor will have no effect on the pad box at either side of the machine until the operator subsequently treadles the machine, and the danger to the operator which would present itself in the absence of such safety mechanism by the sudden upward movement of one of the pad boxes upon starting the pump is eliminated.

At the beginning of a day's operation an operator will preferably place a lasted shoe on each of the pad boxes after which the treadle 28 is depressed moving the bar 158 (Fig. 8) to the left and turning the valve element in a counter-clockwise direction into the position shown in Fig. 14. It will be understood that were the valve element displaced 45° from the position shown in Fig. 13 when the machine was shut down, due to the valve being in the position shown in Fig. 14. prior to stopping the machine, depression of the treadle after starting the pump would move the valve element into the position of Fig. 12. It is assumed, however, that the valve element is moved into the position shown in Fig. 14. It will further be understood that, whereas the treadle normally moves the valve through an angle of 45°, when the valve is in a midposition as shown in Fig. 13, depression of the treadle will merely complete the movement of the valve into an operating position. The pressure chamber 126 is now connected by ports 138 and 142 to the passageway 216 in the manifold 212 (Figs. 11 and 17) so that pressure fluid flows through this passageway and through port 218 into the bottom of the small cylinder 18 at the right side of the machine. The fluid pressure acts on the small piston 22 to move it with the large piston 20 and the pad box carried thereby upwardly at a fast rate until the shoe carried thereby moves into engagement with the jack. During this period pressure fluid is drawn into the large cylinder 16 by the movement of the piston 20 therein, the fluid flowing from the reservoir through pipe 134, the exhaust chamber 132, passageway 230 in the manifold 212 (Fig. 11), port 232 (Fig. 16), passageway 268, ports 238, 240 in the valve sleeve 236 and passageway 264 into the large cylinder. If the pad box at the left side of the machine had been in a raised position such as it would normally assume with the pad box at the right side of the machine in its down position, except when the machine is first started, pressure fluid would flow from the large cylinder at that side of the machine directly into the large cylinder at the right side of the machine as heretofore explained thereby reducing the load on the pump.

During this initial upward movement of the pad box by the pressure of the fluid exerted on the small piston 22, the pressure of the operating fluid is limited by the pressure regulating valve 276 (Figs. 9 and 17) which, by way of example, will remain closed until the pressure in the chamber 126 and accordingly the pressure within the small cylinder reaches 200 lbs. per square inch. The inertia of the pistons 20, 22 and the pad box carried thereby is great enough so that when the valve element 146 is initially turned into the position shown in Fig. 14 the pressure within the small cylinder will rapidly rise and consequently the upward movement of the piston will start immediately. The initial surge of pressure within the small cylinder may be great enough momentarily to cause the valve 252 (Fig. 16) to move downwardly but the suction created by the upward movement of the large piston 20 will act on the uppermost element of the valve 252 augmenting the action of the spring 250 thereby returning the valve into its uppermost position which is that indicated at the left in Fig. 17. Once the inertia of the parts is overcome the pressure within the small cylinder will drop until the shoe carried by the pad box moves into engagement with the jack which thereby offers resistance to further upward movement and the pressure within the small cylinder will then increase moving the valve 252 downwardly into the position shown at the right in Fig. 17.

The valve 280 will now be forced upwardly because of the pressure built up in the chamber 126, as shown in Fig. 17, thereby to permit flow of fluid into the passageway 288 which is in effect part of a branch passageway between the large cylinder and the passageway connecting the pump and the small cylinder. The fluid acts on the lowermost surface of the valve element 296 and inasmuch as this valve element will be set to open at a pressure not exceeding the pressure at which valve 282 opens, it will move upwardly as indicated in Fig. 17, permitting some of the fluid to flow upwardly into the chamber 298 whence it will pass through the pipe 300 and port 302 into the exhaust chamber 132 from which it flows back to the fluid reservoir. Fluid will also flow at this time through the branch passageway above referred to which includes the right-hand pipe 330, ports 242 and 244 which are placed in communication by the downward movement of the valve element 252 and the passageway 264 into the large cylinder so that fluid under whatever pressure the valve 296 is set for is applied to the large piston. At this time the communication between the large cylinder 16 and the reservoir is cut off by movement of the valve element 252 into its lowermost position.

By providing the pressure-reducing valve 297, the pressure of the fluid within the large cylinder 16 may be regulated as desired to control the pressure applied to the work whereas the pressure-regulating valve 276 permits a heavier unit pressure to be applied to the small piston 22 so that the upward movement of the pistons may be started rapidly. Were a single valve employed in place of the valves 276 and 297, the pressure of the fluid exerted on the small piston 22 would be dependent upon the final pressure to be applied to the work and in the event that a low pressure were to be applied, the unit pressure available in the small cylinder would be necessarily low. In this event, in order to obtain a high initial acceleration, the piston 22 would have to be larger in diameter and consequently more fluid would have to be pumped into the small cylinder during the initial closing movement. This would necessitate the use of a larger pump and a decrease in the efficiency of operation of the machine. By utilizing a small piston for the initial closing movement a small pump having a relatively low output but capable of producing high pressures permits rapid upward movement of the pad box and sufficient pressure is available with the valve arrangement employed to obtain rapid starting movement. This is effected, without impairing the flexibility of the machine, by the employment of the pressure-reducing valve which provides if desired anywhere from zero pressure in the large cylinder up to any desired pressure.

It will be obvious that in the final pressure application, very little upward movement is imparted to the pistons so that the amount of fluid necessary to be supplied to the cylinders is negligible and this is readily supplied by a small pump.

The application of pressure to the work continues until the operator again depresses the treadle moving the valve element 146 into the position shown in Fig. 12 in which the pressure chamber 126 is connected through ports 138, 140 to the chamber 128 communicating with the left side of the machine, the fluid from the small cylinder at the right side of the machine now exhausting through ports 142, 144. The fluid from the large cylinder at the right side of the machine flows as heretofore described into the large cylinder at the left side of the machine thereby to maintain this latter cylinder supplied with fluid as the pistons are moved upwardly, thus minimizing the load on the pump. The cycle of operations heretofore described in connection with the right side of the machine is now repeated at the left side of the machine.

When the machine is again shut down by stopping the pump the piston 178 (Fig. 8) is moved upwardly by the spring 180 (Fig. 9) acting thereon, turning the valve element back into a position corresponding to that of Fig. 13 as heretofore described whereupon the pad box which was last elevated will rapidly descend and no movement will be imparted thereto upon restarting the pump until subsequent depression of the treadle by the operator. Should the treadle be depressed while the machine is at rest the valve element 146 will not be moved inasmuch as the bar 158 (Fig. 7) is held in an elevated position and out of operative relation to the ratchet 150, and consequently the valve remains in the "safe" position as long as the machine is at rest.

Having thus described our invention, what we claim as new and desire to secure by Letters Patent of the United States is:

1. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, means for supplying pressure fluid to said cylinders comprising a pump, a fluid circuit between the outlet of said pump and the small cylinder, a branch circuit between said circuit and the large cylinder, a valve operative in response to a rise in pressure in the first circuit to a predetermined value to open the branch circuit to the first circuit, and a pressure-reducing valve in the branch circuit.

2. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, means for supplying pressure fluid to said cylinders comprising a pump, a fluid circuit between the outlet of said pump and the small cylinder, a branch circuit between said circuit and the large cylinder, a valve operative in response to a rise in pressure in the first circuit to a predetermined value to open the branch circuit to the first circuit, a pressure-reducing valve in the branch circuit, and means for adjusting said pressure-reducing valve to control the pressure in the large cylinder.

3. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, means for supplying pressure fluid to said cylinders comprising a pump, a fluid circuit between the outlet of said pump and the small cylinder, a branch circuit between said fluid circuit and the large cylinder, a fluid reservoir, a third fluid circuit between said large cylinder and the fluid reservoir, a valve operative in response to a rise in pressure in the first circuit to a predetermined value to open the branch circuit to the first circuit, a pressure-reducing valve in the branch circuit, and a valve normally closing said second circuit to the large cylinder but movable in response to a rise in pressure in the small cylinder to a predetermined value to close the third circuit and open the second circuit.

4. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, means for supplying pressure fluid to said cylinders comprising a pump, means providing communication between the discharge side of said pump and said small cylinder, a pressure-regulating valve for limiting the fluid pressure in said small cylinder, means connecting the outlet side of said valve to said large cylinder, and a pressure-reducing valve in said connecting means.

5. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, means for supplying pressure fluid to said cylinder, comprising a pump, means providing communication between the discharge side of said pump and said small cylinder, a pressure-regulating valve for limiting the fluid pressure in said small cylinder, means connecting the outlet side of said valve to said large cylinder, a pressure-reducing valve in said connecting means, and means for adjusting said pressure-reducing valve thereby to control the pressure of the fluid in the large cylinder.

6. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, means for supplying pressure fluid to said cylinders include a pump, means providing communication between the discharge side of said pump and said small cylinder, a pressure-regulating valve for limiting the pressure of the fluid in said small cylinder, means connecting the outlet side of said valve to said large cylinder, a pressure-reducing valve in said connecting means, a reservoir, means providing communication between the large cylinder and the reservoir, and means responsive to the pressure of fluid in said small cylinder in control of said last-named means to shut off communication between the large cylinder and reservoir when the pressure in the small cylinder reaches a predetermined value.

7. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, means for supplying pressure fluid to said cylinders including a pump, means providing communication between the discharge side of said pump and said small cylinder, a pressure-regulating valve for limiting the pressure of fluid to said small cylinder, means connecting the outlet side of said valve to said large cylinder, a pressure-reducing valve in said connecting means, a reservoir, means providing communication between the large cylinder and the reservoir, a second pressure-regulating valve controlling the flow through said connecting means and said last-named means, said second pressure-regulating valve having an element subject to the pressure of fluid in said small cylinder and arranged in response to a rise in pressure therein to a predetermined value to open said connecting means to said large cylinder and to shut off communication between the large cylinder and the reservoir.

8. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, a pump for supplying pressure fluid to said cylinders, a valve responsive to the pressure of fluid within the small cylinder for preventing flow of fluid from the pump to the large cylinder until the pressure within the small cylinder reaches a predetermined value, a pressure-regulating valve for limiting the pressure of fluid from the pump to the small cylinder, and a pressure-reducing valve in series with the pressure-regulating valve for limiting the pressure of fluid from the pump to the large cylinder.

9. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, and means for supplying fluid under pressure to the small cylinder until the pressure therein reaches a predetermined value and then supplying pressure fluid to the large cylinder at a reduced pressure.

10. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, and means for supporting fluid under pressure to the small cylinder until the pressure therein reaches a predetermined value and then supplying pressure fluid to the large cylinder, said means including a pressure-reducing valve for limiting the pressure in the large cylinder to any predetermined value not exceeding the pressure of fluid in the small cylinder.

11. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, means for supplying pressure fluid to said cylinders including a pump, a pressure-regulating valve limiting the pressure of fluid in the small cylinder, a circuit between the outlet side of said valve and the large cylinder, and a pressure-reducing valve in said curcuit.

12. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, means for supplying pressure fluid to said cylinders including a pump, a pressure-regulating valve limiting the pressure of fluid in the small cylinder, a circuit between the outlet side of said valve and the large cylinder, a pressure-reducing valve in said circuit, and a valve normally closing said circuit but arranged to open in response to a rise in pressure in the small cylinder to a predetermined value.

13. Pressure-applying mechanism comprising a member movable to apply pressure to a work piece, a small piston for moving said member rapidly into pressure-applying position, a large piston for exerting heavy pressure on said member, a small cylinder and a large cylinder housing said small and large pistons respectively, means for supplying pressure fluid to said cylinders including a pump, a pressure-regulating valve limiting the pressure of fluid in the small cylinder, a circuit between the outlet side of said valve and the large cylinder, a pressure-reducing valve in said circuit, a valve normally closing said circuit but arranged to open in response to a rise in pressure in the small cylinder to a predetermined value, a fluid reservoir, and means connecting said large cylinder and said reservoir, said valve having an element arranged to interrupt flow through said connecting means in response to said opening movement of said valve.

14. Pressure-applying mechanism comprising a plurality of pressing stations each of which comprises a member movable to apply pressure to a work piece, a piston connected to said member, and a cylinder housing said piston, a pump, a rotary valve member controlling communication between said pump and each of said cylinders and arranged in response to successive movements of rotation in one direction to connect the outlet of the pump successively to the cylinders of each station of the machine, and means for imparting successive movements of equal extent in one direction to said valve.

15. Pressure-applying mechanism comprising a plurality of pressing stations each of which comprises a member movable to apply pressure to a work piece, a piston connected to said member, and a cylinder housing said piston, a pump, a rotary valve member controlling communication between said pump and each of said cylinders and arranged in response to successive movements of rotation in one direction to connect the outlet of the pump successively to the cylinders of each station of the machine, a treadle, means operative in response to depression of said treadle for turning said valve in one direction, means for limiting the extent of such movement of the valve by depression of the treadle, and means for preventing retrograde movement of the valve.

16. Pressure-applying mechanism comprising a plurality of pressing stations each of which comprises a member movable to apply pressure to a work piece, a piston supporting said member, and a cylinder housing said piston, a fluid reservoir, a pump, a rotary valve for directing fluid selectively from said pump to said cylinders, and means operative in response to a drop in pressure at the discharge side of said pump for turning said valve into a position in which all of said cylinders are connected to the reservoir.

17. Pressure-applying mechanism comprising a plurality of pressing stations each of which comprises a member movable upwardly to apply pressure to a work piece, a piston supporting said member and a cylinder housing said piston, a fluid reservoir, a pump, valve means for directing fluid selectively from the discharge side of said pump to said cylinders, operator-controlled means for moving said valve means, and means operative in response to a drop in pressure at the discharge side of said pump for moving said valve means into a position in which all of said cylinders are connected to the reservoir and for rendering said operator-controlled means inoperative to move the valve means.

18. Pressure-applying mechanism comprising a plurality of pressing stations each of which comprises a member movable upwardly to apply pressure to a work piece, a piston supporting said member and a cylinder housing said piston, a fluid reservoir, a pump for supplying pressure fluid from said reservoir to said cylinders, a valve movable into successive operative positions for controlling the flow of fluid from said pump selectively to said cylinders and movable into other positions in which the outlet of the pump and all of said cylinders are connected directly to said reservoir, means controlled by the operator for moving said valve from one operative position to another, and means operative automatically upon stoppage of said pump for moving said valve into one of said other positions.

19. Pressure-applying mechanism comprising a plurality of pressing stations each of which comprises a member movable upwardly to apply pressure to a work piece, a piston supporting said member and a cylinder housing said piston, a fluid reservoir, a pump for supplying pressure fluid from said reservoir to said cylinders, a valve movable into successive operative positions for controlling the flow of fluid from said pump selectively to said cylinders and movable into other positions in which the outlet of the pump and all of said cylinders are connected directly to said reservoir, means controlled by the operator for moving said valve from one operative position to another, means operative automatically upon stoppage of said pump for moving said valve into one of said other positions, and means rendering said operator-controlled means ineffective to move said valve as long as said pump is idle.

20. Pressure-applying mechanism comprising a plurality of pressing stations each of which comprises a member movable upwardly to apply pressure to a work piece, a piston supporting said member and a cylinder housing said piston, a fluid reservoir, a pump for supplying pressure fluid from said reservoir to said cylinders, a valve movable into successive operative positions for controlling the flow of fluid from said pump selectively to said cylinders and movable into intermediate positions in which the outlet of the pump and all of said cylinders are connected directly to said reservoir, a ratchet carried by said valve, a treadle, a ratchet-operating means connected to said treadle and arranged in response to successive depressions of said treadle for moving said valve into successive operative positions, a pawl, spring means urging said pawl into a position to actuate said ratchet and move said valve into an intermediate position, and means operative in response to the pressure of fluid at the outlet of the pump for moving said pawl into an inoperative position when the pressure attains a predetermined value.

21. Pressure-applying mechanism comprising a plurality of pressing stations each of which comprises a member movable upwardly to apply pressure to a work piece, a piston supporting said member and a cylinder housing said piston, a fluid reservoir, a pump for supplying pressure fluid from said reservoir to said cylinders, a valve movable into successive operative positions for controlling the flow of fluid from said pump selectively to said cylinders and movable into intermediate positions in which the outlet of the pump and all of said cylinders are connected directly to said reservoir, a ratchet carried by said valve, a treadle, a ratchet-operating means connected to said treadle and arranged in response to successive depressions of said treadle for moving said valve into successive operating positions, a pawl, spring means urging said pawl into a position to actuate said ratchet and move said valve into an intermediate position, means operative in response to the pressure of fluid at the outlet of the pump for moving said pawl into an inoperative position when the pressure attains a predetermined value, and means associated with said pawl for moving said ratchet-operating means into an inoperative position upon movement of the pawl into engagement with the ratchet.

22. Pressure-applying mechanism comprising two pressing stations each of which comprises a member movable to apply pressure to a work piece, a small piston for moving said member rapidly into pressure-applying position, a large piston for exerting heavy pressure on said member, a small cylinder and a large cylinder housing said small and large pistons respectively, a reservoir, a pump for supplying pressure fluid alternately from said reservoir to said stations and successively to the small and large cylinders of each station, and means operative upon connecting the pump to the small cylinder of one station for supplying fluid to the large cylinder of that station from the large cylinder of the other station.

23. Pressure-applying mechanism comprising two pressing stations each of which comprises a member movable to apply pressure to a work piece, a small piston for moving said member rapidly into pressure-applying position, a large piston for exerting heavy pressure on said member, a small cylinder and a large cylinder housing said small and large pistons respectively, a reservoir, a pump for supplying pressure fluid alternately from said reservoir to said stations and successively to the small and large cylinders of each station, and means operative upon connecting the pump to the small cylinder of one station for supplying fluid to the large cylinder of that station from the large cylinder of the other station and for interrupting communication between said large cylinders when the outlet of the pump is connected to one of said large cylinders.

THOMAS H. SEELY.
LAMBERT S. LINDEROTH, Jr.

REFERENCES CITED

The following references are of record in the file of this patent:

UNITED STATES PATENTS

| Number | Name | Date |
|---|---|---|
| 1,241,691 | White | Oct. 2, 1917 |
| 1,625,527 | Demnitz | Apr. 19, 1927 |
| 1,700,363 | Barrett et al. | Jan. 29, 1929 |
| 2,134,726 | Meyer | Nov. 1, 1938 |
| 2,284,228 | Page | May 26, 1942 |

Certificate of Correction

Patent No. 2,459,845. January 25, 1949.

THOMAS H. SEELY ET AL.

It is hereby certified that errors appear in the printed specification of the above numbered patent requiring correction as follows:

Column 16, line 29, claim 5, for the word "cylinder" read *cylinders*; lines 46 and 47, claim 6, for "include" read *including*; column 17, line 49, claim 10, for "supporting" read *supplying*;

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*